No. 889,929. PATENTED JUNE 9, 1908.
G. HOOKHAM & S. H. HOLDEN.
ELECTROLYTIC METER.
APPLICATION FILED NOV. 20, 1905.

2 SHEETS—SHEET 1.

Fig. 1. Fig. 1ª.

No. 889,929. PATENTED JUNE 9, 1908.
G. HOOKHAM & S. H. HOLDEN.
ELECTROLYTIC METER.
APPLICATION FILED NOV. 20, 1905.

2 SHEETS—SHEET 2.

UNITED STATES PATENT OFFICE.

GEORGE HOOKHAM AND SYDNEY HOLMWOOD HOLDEN, OF BIRMINGHAM, ENGLAND.

ELECTROLYTIC METER.

No. 889,929.   Specification of Letters Patent.   Patented June 9, 1908.

Application filed November 20, 1905. Serial No. 288,296.

*To all whom it may concern:*

Be it known that we, GEORGE HOOKHAM, a subject of the King of Great Britain and Ireland, and residing at 4 New Bartholomew street, Birmingham, and SYDNEY HOLMWOOD HOLDEN, a subject of the King of Great Britain and Ireland, and residing at 4 New Bartholomew street, Birmingham, England, have invented certain new and useful Improvements in Electrolytic Meters, of which the following is a specification.

Our invention relates to electricity meters operating on the principle of the ordinary gas voltameter. In such meters it is necessary to measure the gas given off by electrolysis and in meters as heretofore constructed difficulties have arisen by reason of energy consumed in the electrolytic cell and variation of the constant of the meter with varying barometric pressure.

The objects of our invention are to construct an electrolytic meter whose readings are not affected by changes of barometric pressure and also to construct such a meter capable of being used in shunt and requiring but little energy for its operation.

The invention consists in the use of a cell provided with a graduated tube of small bore in which gas produced by electrolysis is measured at a pressure independent of barometric pressure.

The invention also consists in the use of an electrolytic cell which is hermetically sealed.

The invention also consists in the construction of a meter using an electrolytic cell in which gas is absorbed at one electrode and evolved at the other, the gas absorbed or evolved being measured.

The invention also consists in the use in an electrolytic meter of an electrode capable of absorbing hydrogen or other gas, the electrode being partly in contact with the electrolyte and partly in contact with the hydrogen or other gas to be absorbed.

The invention further consists in the various arrangements hereinafter described.

Figure 1:
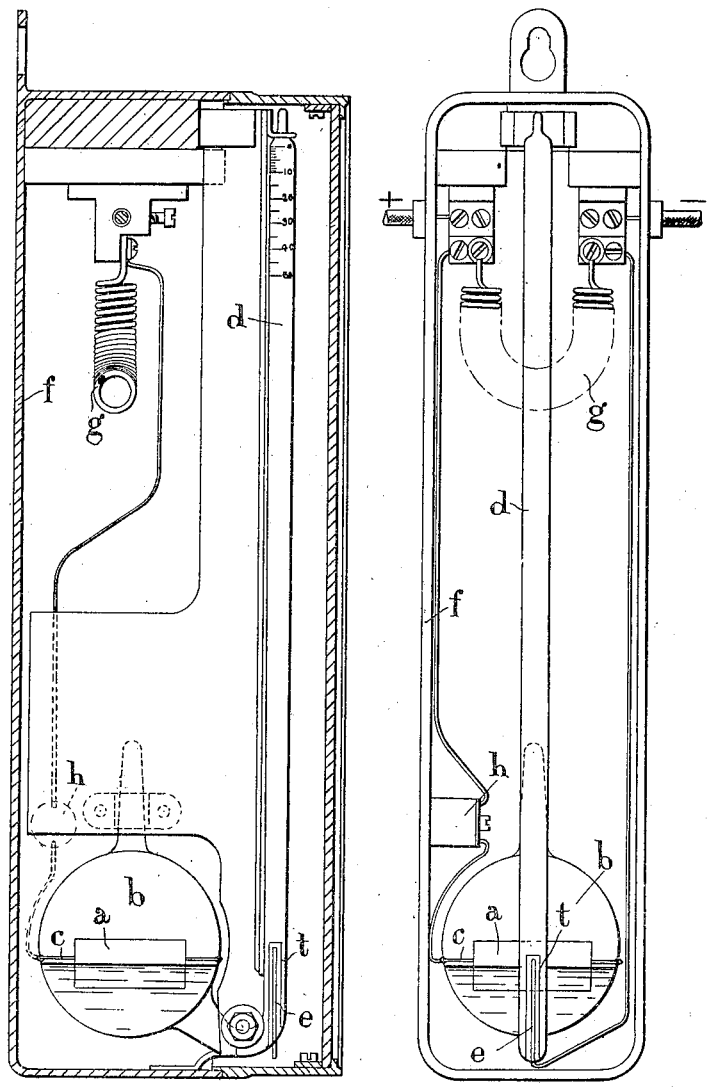
Figure 2:
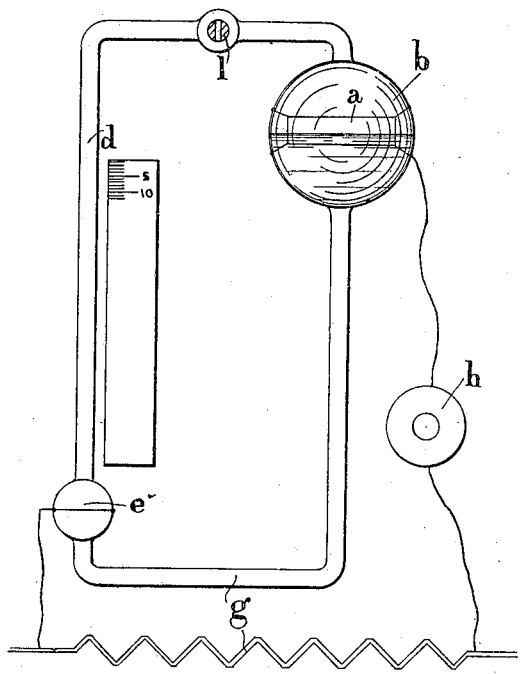

Referring to the accompanying drawings:— Figure 1 is a sectional elevation of one modification of our invention; Fig. 1ª being a front elevation with the cover removed. Fig. 2 is an elevation showing another modification diagrammatically.

In the meter shown in Figs. 1 and 1ª the anode $a$, is in the form of a rectangular strip of platinum preferably coated with platinum black and suspended across the bulb $b$, the connection being made by one of the suspending wires, $c$. The bulb is in one piece with a tube connecting it with a graduated tube, $d$, of small bore, the latter tube being vertical when the meter is in operation. The electrolyte used is dilute sulfuric acid containing 10 p. c. of the acid, the quantity of electrolyte being sufficient to fill the tube, $d$, and cover half the anode, $a$, when the tube, $d$, is vertical the part of the bulb above the electrolyte before the tube is sealed being filled with hydrogen which may if desired be under pressure. The filling with hydrogen may be effected in any well-known manner. The cathode consists of platinum wire, $e$, coated with platinum black at the lower end of the graduated tube, $d$, and may if desired be inclosed in a cap $t$ except at its upper end for the purpose of isolating the portion of the liquid immediately surrounding the cathode. The object of coating the anode with platinum black in the meter illustrated is to make the anode capable of absorbing hydrogen from the atmosphere of hydrogen in the bulb, $b$, the effect of this is that an electrode which operates practically as a hydrogen electrode is produced. The cathode is coated with platinum black to increase the active surface. The electrolytic cell may be conveniently mounted on a hinge in the box, $f$, carrying the shunt coil, $g$, and a resistance, $h$, in series with the cell and of large resistance in comparison with the resistance of the cell itself. The resistances, $g$ and $h$, are made of the same material which should have a small temperature coefficient so that temperature errors are avoided. In order to set the meter to zero the cell is tilted so that the tube, $d$, is filled with liquid, the tube, $d$, being afterwards replaced in the vertical position for collecting the gas given off at the cathode. It will be seen that as the meter is hermetically sealed no further provision against barometric changes is needed. In case the two separate portions of gas in the cell are at different levels, they may tend to become equal in pressure by diffusion through the electrolyte and to prevent this we may if desired, cover the surface of the latter with oil. Or we may fill the bend of the connecting tube with sand, thus forming a porous partition which will allow the liquid to flow past when the cell is tilted to set the instrument to zero. The operation of this form of meter is as follows: The meter being set to zero as above described and connected to the work circuit through the terminals at the ends of the coil $g$, as shown in Fig. 1ª, a known proportion of the current to be measured will flow through the electrolytic cell from $a$ to $e$, and electrolysis will take place, hydrogen being given off at the cathode, $e$, and collected in the measuring tube $d$. The quantity of hydrogen measures the quantity of current that has passed. The oxygen generated by the electrolysis, while still nascent is in contact with the hydrogen which has been absorbed from the store in the bulb, $b$ and which has diffused throughout the platinum covering of the anode. The two gases therefore combine under the so called catalytic action of the spongy platinum and form water. The net result of this action therefore at the anode is ($a$) the store of hydrogen in the bulb, $b$, is diminished by a small amount, ($b$) water is added to the electrolyte in an equal amount to that decomposed by the current, and thus no renewal of electrolyte is necessary ($c$) no gas leaves the surface of the electrode. As regards the cathode an amount of hydrogen is set free, and ascends in the tube, $d$, equal to that which has combined with the oxygen generated in the anode. It will thus be seen that on resetting the cell by tilting it so that the hydrogen in the tube, $d$, passes into the bulb, $e$, the whole apparatus is exactly in a similar condition to its original condition that is to say it contains exactly the same quantity of electrolyte, and the same amount of the same gas—hydrogen.

In the arrangement shown in Fig. 2 instead of tilting the cell to reset to zero, we provide a stop cock, $l$, which is opened to allow the gas to pass back from the upper part of the tube, $d$, to the bulb, $b$, the pressure of the liquid in the bulb causing the liquid in the tube, $d$, to rise to the zero division of the scale. The communication through the cock $l$, is then cut off and the meter is ready for use. The operation of this arrangement is similar to that above described with reference to Figs. 1 and 1ª, the only difference lying in the method by which the meter is reset.

Having thus described our invention what we claim as new and desire to secure by Letters Patent is:—

1. An electricity meter; comprising in combination an electrolytic cell, including an electrolyte, a depolarizing electrode, and a gas evolving electrode; and means for measuring the gas evolved at said electrode, as set forth.

2. An electrolytic meter having a storage of gas and a depolarizing electrode consisting in an electrode capable of absorbing the said gas, partly immersed in electrolyte and partly in the storage of gas; as set forth.

3. An electrolytic meter, comprising in combination a cell, electrolyte and gas under pressure in said cell, an electrode capable of absorbing said gas partly immersed in said electrolyte, and a gas measuring chamber, as set forth.

4. An electrolytic meter comprising in combination a cell, electrolyte and hydrogen in said cell, an electrode capable of absorbing hydrogen partly immersed in said electrolyte, thus forming a depolarizing electrode and a gas measuring chamber, as set forth.

5. An electrolytic meter, comprising in combination a cell, electrolyte and gas in said cell, an electrode capable of absorbing said gas partly immersed in said electrolyte, a measuring chamber, a connection between the lower ends of said cell and said measuring chamber, said cell and measuring chamber being mounted on a hinge, as and for the purposes described.

6. An electricity meter comprising in combination an electrolytic cell including an electrolyte, a depolarizing electrode, a gas evolving electrode and a measuring chamber adapted for the measurement of the evolved gas at a pressure independent of barometric pressure; as set forth.

In testimony whereof we have signed our names to this specification in the presence of two subscribing witnesses.

GEORGE HOOKHAM.
SYDNEY HOLMWOOD HOLDEN.

Witnesses:
JOSHUA BROWN,
H. BALL.